United States Patent
Arai

(10) Patent No.: US 7,956,765 B2
(45) Date of Patent: *Jun. 7, 2011

(54) MESSAGE IMAGE DISPLAY DEVICE, MESSAGE IMAGE DISPLAY DEVICE CONTROL METHOD, AND INFORMATION STORAGE MEDIUM

(75) Inventor: Hiroaki Arai, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 937 days.

This patent is subject to a terminal disclaimer.

(21) Appl. No.: 11/908,483

(22) PCT Filed: Feb. 7, 2006

(86) PCT No.: PCT/JP2006/302037
§ 371 (c)(1),
(2), (4) Date: Sep. 12, 2007

(87) PCT Pub. No.: WO2006/098099
PCT Pub. Date: Sep. 21, 2006

(65) Prior Publication Data
US 2009/0102975 A1    Apr. 23, 2009

(30) Foreign Application Priority Data
Mar. 14, 2005 (JP) ................ 2005-071538

(51) Int. Cl.
*G08B 7/00* (2006.01)
(52) U.S. Cl. ............ 340/815.69; 340/815.4
(58) Field of Classification Search ........... 340/815.4, 340/815.69
See application file for complete search history.

(56) References Cited

U.S. PATENT DOCUMENTS

| 6,254,477 B1 | 7/2001 | Sasaki et al. |
| 6,676,519 B2 * | 1/2004 | Nakazawa ............ 463/31 |
| 2003/0003992 A1 | 1/2003 | Furuya |
| 2004/0100422 A1 * | 5/2004 | Greenyer ............ 345/30 |

FOREIGN PATENT DOCUMENTS

| JP | 05224864 A | 9/1993 |
| JP | 8202522 A | 8/1996 |
| JP | 2003000952 A | 1/2003 |
| JP | 2003164669 A | 6/2003 |
| TW | 541193 B | 7/2003 |
| TW | 570833 B | 1/2004 |

OTHER PUBLICATIONS

Search Report for Taiwan Patent Application No. 95106059, dated May 23, 2008.

* cited by examiner

*Primary Examiner* — Travis R Hunnings
(74) *Attorney, Agent, or Firm* — Sughrue Mion, PLLC

(57) ABSTRACT

There is provided a message image display device enabling a user to grasp a content of each massage image when a plurality of message images are displayed. A display control unit (76) causes a display unit (82) to display a screen containing a plurality of message images. A judging unit (78) judges whether display of at least a part of a message image is limited by one or more other message images. A display-time determining unit (84) determines a display time of each of message images according to the judgment result of the judging unit (78). The display control unit (76) displays each of the message images over the display time of the message image determined by the display-time determining unit (84).

6 Claims, 13 Drawing Sheets

FIG.10

| ID | PRESENT POSITION | HIT POINT | MOVING ABILITY | OFFENSIVE ABILITY | ATTACKABLE RANGE | DEFENSIVE ABILITY |
|----|------------------|-----------|----------------|-------------------|------------------|-------------------|
| P1 | ... | ... | ... | ... | ... | ... |
| P2 | ... | ... | ... | ... | ... | ... |
| E1 | ... | ... | ... | ... | ... | ... |
| E2 | ... | ... | ... | ... | ... | ... |
| E3 | ... | ... | ... | ... | ... | ... |
| E4 | ... | ... | ... | ... | ... | ... |
| E5 | ... | | | | | ... |

| ID | MESSAGE CHARACTER STRING | SHAPE |
|---|---|---|
| 1 | I'LL ATTACK YOU | 1 |
| 2 | I'LL COUNTERATTACK AGAINST YOU | 2 |
| 3 | I'LL STAND | 1 |
| 4 | HELP | 3 |

| ID | BALLOON IMAGE TYPE ID | DISPLAY POSITION | REMAINING TIME | DEPTH DEGREE | DEGREE OF IMPORTANCE |
|---|---|---|---|---|---|
| 1 | 2 | X1, Y1 | T1 | D1 | P1 |
| 2 | 4 | X2, Y2 | T2 | D2 | P2 |

MESSAGE IMAGE DISPLAY DEVICE, MESSAGE IMAGE DISPLAY DEVICE CONTROL METHOD, AND INFORMATION STORAGE MEDIUM

TECHNICAL FIELD

The present invention relates to a message image display device, a control method for the message image display device, and an information storage medium.

BACKGROUND ART

There is known a message image display device that displays a plurality of message images. Examples of such a message image display device include a game device that displays a plurality of game characters and displays, in positions corresponding to display positions of the respective characters, with balloon images representing lines of the characters.
[Patent Document 1] JP 2003-952 A

DISCLOSURE OF THE INVENTION

Problems to be Solved by the Invention

In the message image display device described above, because the display of a message image is limited by another message image, a user may be unable to grasp contents of the respective message images.

The present invention has been made in view of the above-mentioned problem, and it is an object of the present invention to provide a message image display device, a control method for the message image display device, and an information storage medium that enable to allow a user to grasp, when a plurality of message images are displayed, contents of the respective message images.

Means for Solving the Problems

In order to solve the above-mentioned problem, a message image display device according to the present invention is a message image display device including: display control means for causing display means to display a screen including plurality of message images; judging means for judging whether the display of at least a part of a message image is limited by one or more other message images among the plurality of message images; and display-time determining means for determining a display time of each of the plurality of message images on the basis of a result of the judgment by the judging means, in which the display control means causes the display means to display each of the plurality of message images over the display time of the message image determined by the display-time determining means.

Further, a control method for a message image display device according to the present invention is a control method for a message image display device including: a display control step of causing display means to display a screen including plurality of message images; a judging step of judging whether the display of at least a part of a message image is limited by one or more other message images among the plurality of message images; and a display-time determining step of determining a display time of each of the plurality of message images on the basis of a result of the judgment by the judging step, in which the display control step include a step of causing the display means to display each of the plurality of message images over the display time of the message image determined by the display-time determining step.

A program according to the present invention is a program for causing a computer to function as a message image display device, and also to function as: display control means for causing display means to display a screen including a plurality of message images; judging means for judging whether the display of at least a part of a message image is limited by one or more other message images among the plurality of message images; and display-time determining means for determining a display time of each of the plurality of message images on the basis of a result of the judgment by the judging means, in which the display control means causes the display means to display each of the plurality of message images over the display time of the message image determined by the display-time determining means.

An information storage medium according to the present invention is a computer-readable information storage medium storing the above program. A program distribution device of the present invention is a program distribution device including an information storage medium storing the above program, for reading out the program from the information storage medium, and distributing the program. A program distribution method of the present invention is a program distribution method including the steps of: reading out a program from an information storage medium storing the above program; and distributing the program.

In the present invention, a screen including a plurality of message images is displayed. A display time of each of the message images is determined on the basis of a result of judgment on whether the display of at least a part of the message image is limited by one or more other message images. According to the present invention, since a display time of each message image is determined on the basis of a result of judgment on whether the display of the message image is limited by one or more other message images, when a plurality of message images are displayed, it is possible to allow a user to grasp content of each of the message images.

Further, according to an aspect of the present invention, the display-time determining means may determine, in determining a display time of one message image of the plurality of message images, when it is judged that display of at least a part of the one message image is limited by one or more other message images among the plurality of message images, a display time of the one or more other message images, and then determine the display time of the one message image on the basis of display times of the one or more other message images.

Further, according to another aspect of the present invention, the display-time determining means may determine, in determining a display time of one message image of the plurality of message images, when it is judged that display of at least a part of the one message image is limited by one or more other message images among the plurality of message images, the display time of the one message image on the basis of a size of the part of the one message image, display of which is limited by the one or more other message images.

Further, according to still another aspect of the present invention, the display-time determining means may determine, in determining a display time of one message image of the plurality of message images, when it is judged that display of at least a part of the one message image is limited by a plurality of other message images among the plurality of message images, the display time of the one message image on the basis of a longest display time among display times of the plurality of other message images.

BRIEF DESCRIPTION OF THE DRAWINGS

FIG. 10 is a diagram showing an example of a unit table.

BEST MODE FOR CARRYING OUT THE INVENTION

Figure 1:
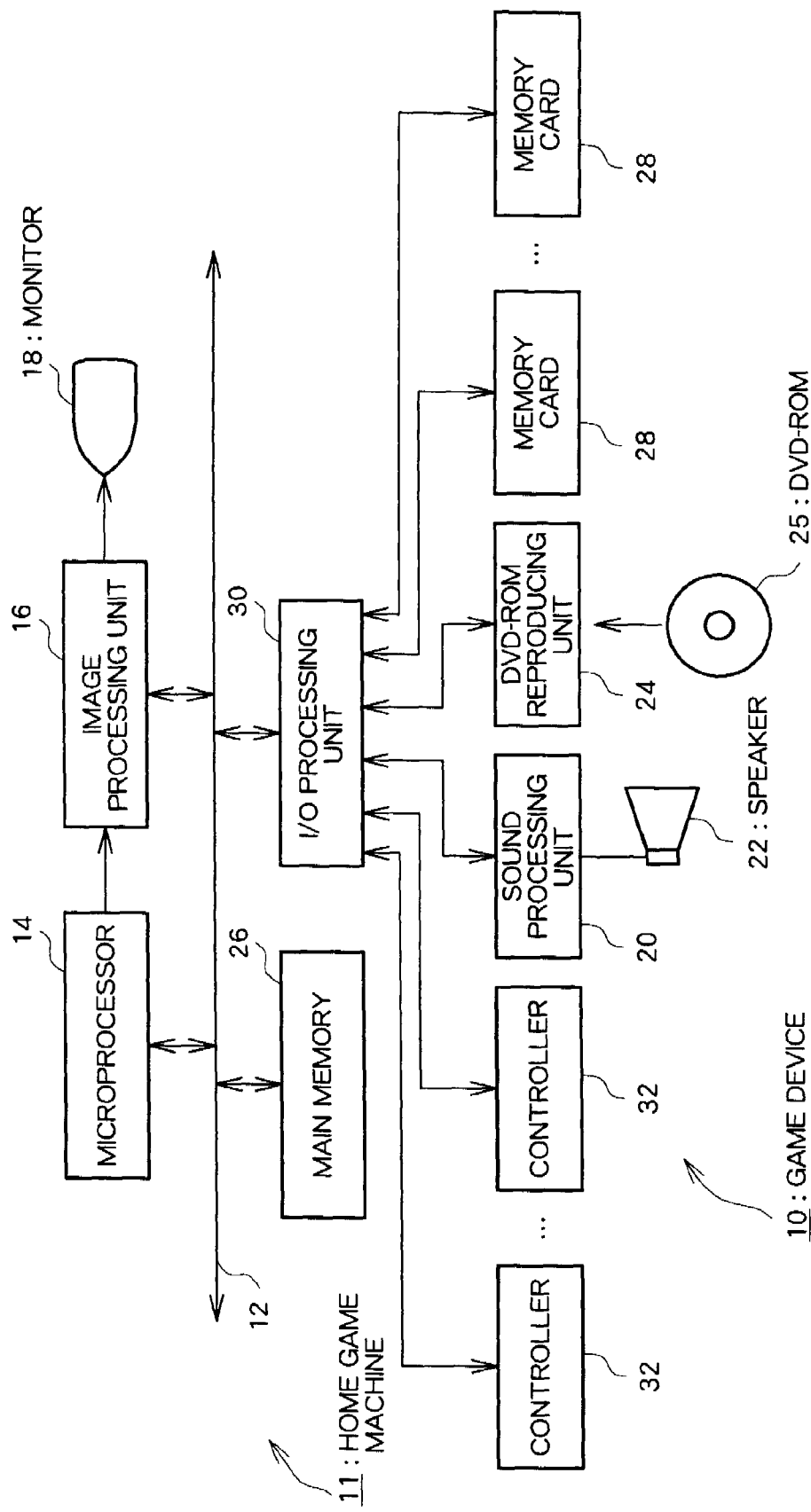
FIG. 1 is a diagram showing a hardware configuration of a game device according to an embodiment of the present invention.

An example of an embodiment of the present invention will be hereinafter explained in detail referring to the drawings. Here, an example will be explained in a case in which the present invention is applied to a game device, which is a mode of a message image display device.

FIG. 1 is a diagram illustrating a hardware structure of a game device according to the embodiment of the present invention. A game device 10 illustrated in FIG. 1 has a structure in which a DVD-ROM 25 as an information storage medium and memory cards 28 are inserted into a home game machine 11, and a monitor 18 and a speaker 22 are connected to the home game machine 11. For example, a domestic TV receiving set is used for the monitor 18, and a built-in speaker thereof is used for the speaker 22.

The home game machine 11 is a well-known computer game system comprising a bus 12, a microprocessor 14, an image processing unit 16, a sound processing unit 20, a DVD-ROM reproducing unit 24, a main memory 26, an input/output (I/O) processing unit 30, and controllers 32. An enclosure accommodates the components other than the controllers 32.

The bus 12 is used for exchanging addresses and/or data among the respective units of the home game machine 11. The microprocessor 14, the image processing unit 16, the main memory 26, and the I/O processing unit 30 are connected to each other via the bus 12 so as to be communicable with each other.

The microprocessor 14 controls the individual units of the home game machine 11 on the basis of an operating system (OS) stored in a ROM (not shown), a program read from the DVD-ROM 25, and the data read from the memory card 28. The main memory 26 comprises, for example, a RAM, and the program read from the DVD-ROM 25 and the data read from the memory card 28 are written in the main memory 26 if necessary. The main memory 26 is also employed as a working memory for the microprocessor 14.

The image processing unit 16 comprises a VRAM and renders, based on the image data sent from the microprocessor 14, a game screen in the VRAM. Then, the image processing unit 16 converts a content thereof into video signals and outputs the video signals to the monitor 18 at predetermined timings.

The I/O processing unit 30 is an interface used for the microprocessor 14 to access the sound processing unit 20, the DVD-ROM reproducing unit 24, the memory card 28, and the controller 32. The sound processing unit 20, the DVD-ROM reproducing unit 24, the memory card 28, and the controller 32 are connected to the I/O processing unit 30.

The sound processing unit 20, which comprises a sound buffer, reproduces and outputs, via the speaker 22, various sound data such as game music, game sound effects, messages, or the like, read from the DVD-ROM 25 and stored in the sound buffer.

The DVD-ROM reproducing unit 24 reads the program recorded on the DVD-ROM 25 in accordance with an instruction given from the microprocessor 14. It is to be noted that the DVD-ROM 25 is employed for supplying the program to the home game machine 11. However, any other various information storage medium such as CD-ROMs, ROM cards, or the like, may also be used. Further, the program may also be supplied to the home game machine 11 from a far-off area via a data communication network such as the Internet, or the like.

The memory card 28 comprises a nonvolatile memory (e.g., an EEPROM). The home game machine 11 has a plurality of memory card slots into which the memory cards 28 are inserted, and the plurality of memory cards 28 can be simultaneously inserted. The memory card 28 is constructed so that the memory card 28 can be inserted into and removed from the memory card slot, and is employed for storing various game data such as save data, or the like.

The controller 32 is a general-purpose operation input means used for a player to input various game operations. The I/O processing unit 30 scans statuses of the respective portions of the controller 32 at an interval of a fixed period (e.g., every 1/60 sec), and transfers operation signals representing scanned results to the microprocessor 14 via the bus 12. The microprocessor 14 determines, based on this operation signal, the game operation by the player. The home game machine 11 is configured to be connectable with the multiple controllers 32, and the microprocessor 14 performs the game control on the basis of the operation signals inputted from the respective controllers 32.

Figure 2:
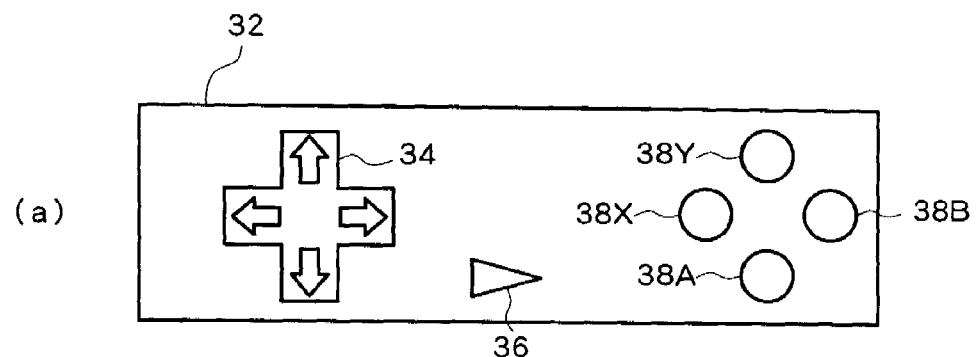
FIG. 2 are diagrams showing an example of a controller.

FIG. 2 are diagrams illustrating an example of the controller 32. The controller 32 illustrated in the figures is a general-purpose game controller. As shown in FIG. 2(a), the surface of the controller 32 is provided with a direction button 34, a start button 36, and buttons 38X, 38Y, 38A, and 38B. Further, as illustrated in FIG. 2(b), the buttons 42L, 42R, formed on the top surface on the left and right sides thereof closer to the front surface, and the buttons 40L, 40R, similarly formed but closer to the rear surface. The direction button 34 has a cross-shape and is normally used for designating a moving direction of a character or a cursor. The start button 36 is a small-sized push button having a triangular shape and is normally used for starting or forcibly ending the game. The buttons 38X, 38Y, 38A, 38B, 40L, 40R, 42L, and 42R are used for other game operations.

The game device 10 having the hardware structure described above provides a simulation game, in which, through execution of the game program read from the DVD-ROM 25 by the microprocessor 14, the player gives instructions relate to a move, an attack, or the like, to operation object units belonging to a player team (which will hereinafter be referred to as player units) to aim at zeroing a hit point of units belonging to an enemy team operated by a computer (which will hereinafter be referred to as enemy units).

This simulation game proceeds alternately by a turn in which the player gives instructions to the player unit (which will hereinafter be referred to as player's turn) and a turn in which the computer gives instructions to the enemy unit (which will hereinafter be referred to as enemy's turn).

In the player's turn, the player gives action instructions such as "move" and "attack" to the player unit. To be specific, the player selects the player unit to which the action instruction is to be given (action instruction object player unit). Then, the player gives the moving instruction to the player unit to move to a position at which an attack can be made on the enemy unit. Further, the player gives an attack instruction to the player unit, which has moved to the position at which the attack can be made on the enemy unit, to attack the enemy unit.

FIGS. 3 to 6 each illustrate an example of the game screen in the case of giving the moving instruction to the player unit in the player's turn. More specifically, FIGS. 3 through 5 each show an example of the game screen in the case of determining a moving destination of the player unit.

Figure 3:
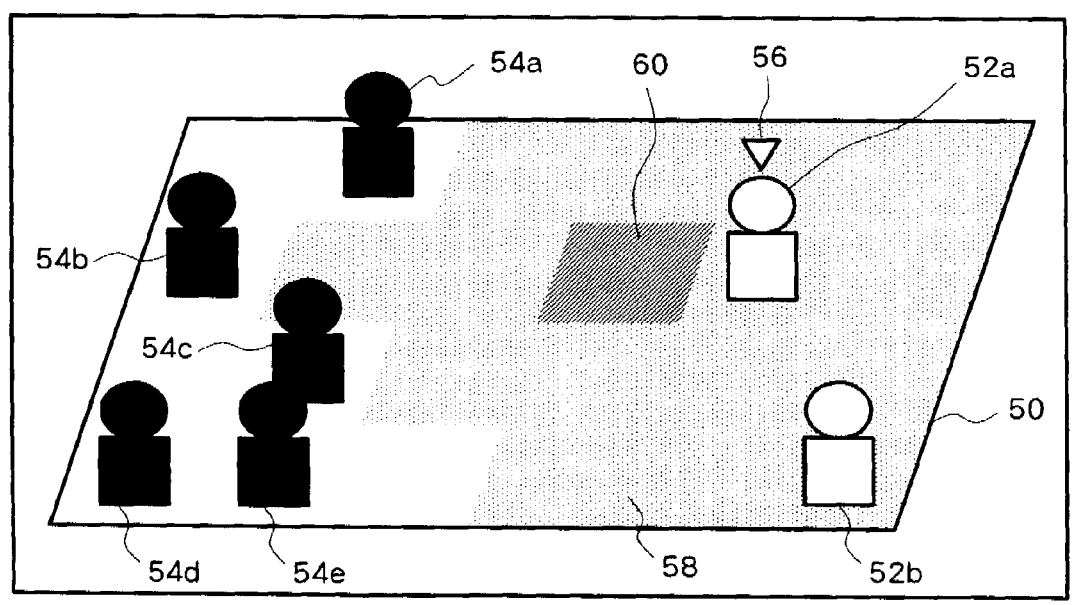
FIG. 3 is a diagram showing an example of a game screen.

As illustrated in FIG. 3, a game field image 50 is displayed on the game screen. Further, player unit images 52a and 52b and enemy unit images 54a, 54b, 54c, 54d, and 54e are displayed on the game screen. Still further, a marker image 56 is displayed above the player unit image 52a on the game screen illustrated in FIG. 3. The marker image 56 indicates the instruction object player unit image. Specifically, on the game screen shown in FIG. 3, the player unit image 52a is defined as a moving instruction object. In other words, the game screen illustrated in FIG. 3 is a screen for determining the moving destination of the player unit image 52a. Moreover, a movable range guide image 58 is displayed on the game screen. The movable range guide image 58 is displayed over the game field image 50, and serves to indicate the movable range of the player unit image 52a as the moving instruction object. Yet further, a cursor image 60 is displayed on the game screen. The cursor image 60 moves across the game field image 50 in accordance with the operation of the direction button 34. On the game screen in a state shown in FIG. 3, the player moves the cursor image 60 to a moving destination position candidate of the player unit image 52a by operating the direction button 34.

Figure 4:
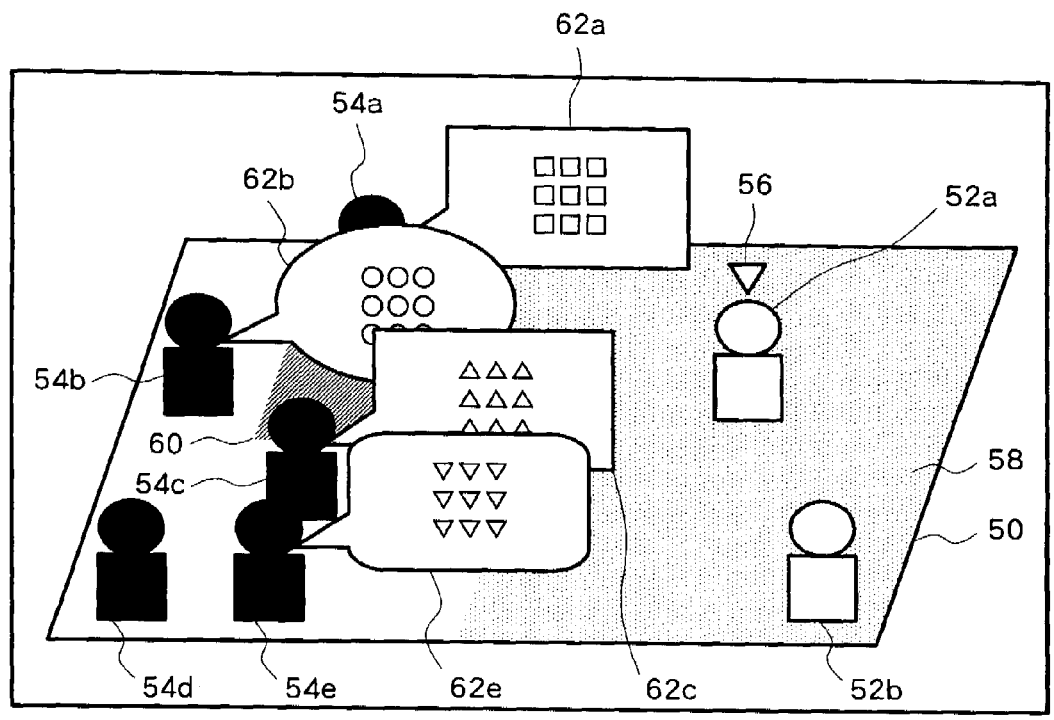
FIG. 4 is a diagram showing an example of a game screen.

When the player moves the cursor image 60, for example, a game screen shown in FIG. 4 is displayed. In the game screen shown in the figure, balloon images 62a, 62b, 62c, and 62e are displayed. The balloon image 62a is a balloon image corresponding to the enemy unit image 54a. Similarly, the balloon images 62b, 62c, and 62e are balloon images corresponding to the enemy unit images 54b, 54c, and 54e, respectively. In the example in the figure, no balloon image corresponds to the enemy unit image 54d.

The balloon image is displayed so as to correspond to (1) the enemy unit that cannot be attacked by the moving instruction object player unit from the moving destination position candidate but is capable of attacking an object at the moving destination position candidate (more precisely, the player unit located at the moving destination position candidate) in the next enemy's turn, or (2) the enemy unit that can be attacked by the moving instruction object player unit from the moving destination position candidate.

For instance, the balloon image corresponding to the former enemy unit has a line such as "I'll attack you" etc. displayed in the balloon.

Further, for example, in the balloon image corresponding to "the enemy unit whose hit point is presumed not to become zero even when attacked by the moving instruction object player unit and which is capable of attacking an object at the moving destination position candidate (more accurately, the player unit located at the moving destination position candidate) in the next enemy's turn" among the latter enemy units, a line expressing an aggressive feeling such as "I'll counter-attack against you" etc. is displayed in the balloon. In this case, a balloon shape of the balloon image is formed in a shape that expresses the aggressive feeling.

Further, for instance, the balloon image corresponding to "the enemy unit whose hit point is presumed not to become zero even when attacked by the moving instruction object player unit and which is incapable of attacking an object at the moving destination position candidate in the next enemy's turn" among the latter enemy units, has a line such as "I'll stand" etc. displayed in the balloon.

Moreover, for example, the balloon image corresponding to "the enemy unit whose hit point is presumed to become zero when attacked by the moving instruction object player unit" among the latter enemy units, has a line expressing a weak-spirited feeling such as "Help" etc. displayed in the balloon. In this case, the balloon shape of the balloon image is formed in a shape expressing the weak-spirited feeling.

According to the display of this balloon image, the player can grasp at a glance from contents and shapes of the balloon images, when the player moves the movement instruction object player unit (the player unit image 52a) to a moving destination position candidate, "to which enemy unit an attack can be performed", "whether it is possible to decrease a hit point of the enemy unit to zero with the attack", "which enemy unit is likely to attack in the next enemy's turn", and the like. In other words, the player can relatively easily acquire information necessary for determining a moving destination position of the player unit.

Figure 5:
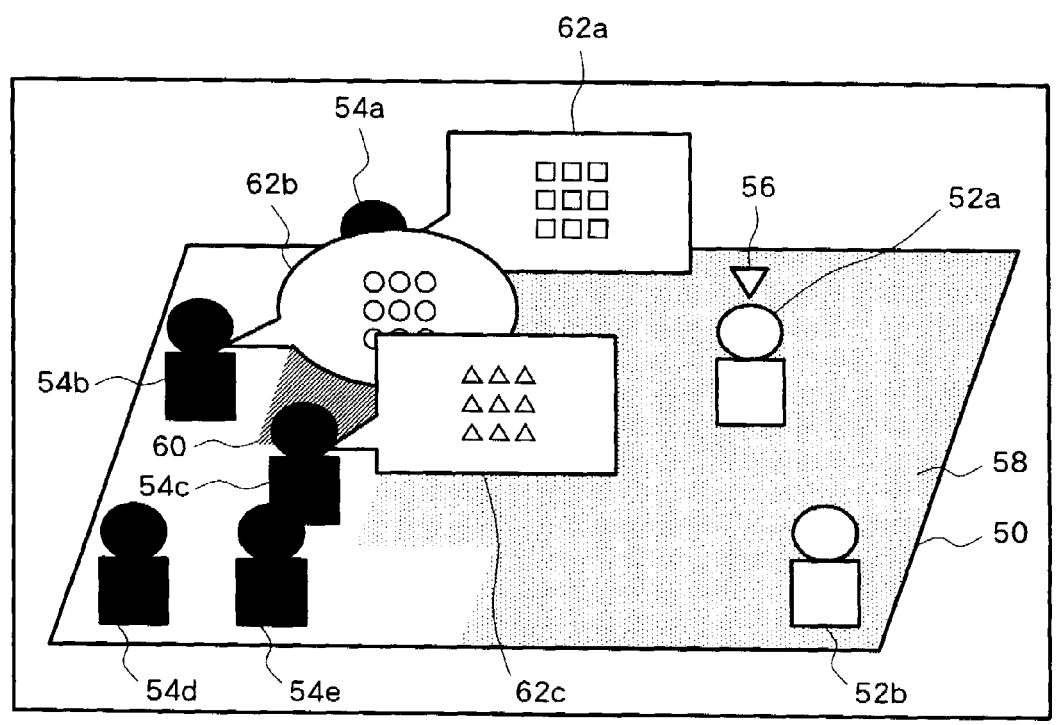
FIG. 5 is a diagram showing an example of a game screen.

In a game screen shown in FIG. 4, the balloon images 62a, 62b, and 62c are displayed so as to overlap one another, so content thereof is difficult to be viewed. In this regard, in the game device 10, when a predetermined time elapses while the state shown in the figure is maintained, i.e., while the position of the cursor image 60 is not updated by direction instruction operation, as shown in FIG. 5, the balloon image 62e on which another balloon image is not superimposed disappears. After that, when the predetermined time further elapses while the state shown in FIG. 5 is maintained, the balloon image 62c on which another balloon image is not superimposed disappears. Similarly, when the predetermined time further elapses while the state is maintained, the balloon image 62b on which another balloon image is not superimposed disappears. In this way, in the game device 10, since the balloon images disappear in order from the one displayed in the front of the game screen, the player can grasp contents of the respective balloon images.

Figure 6:
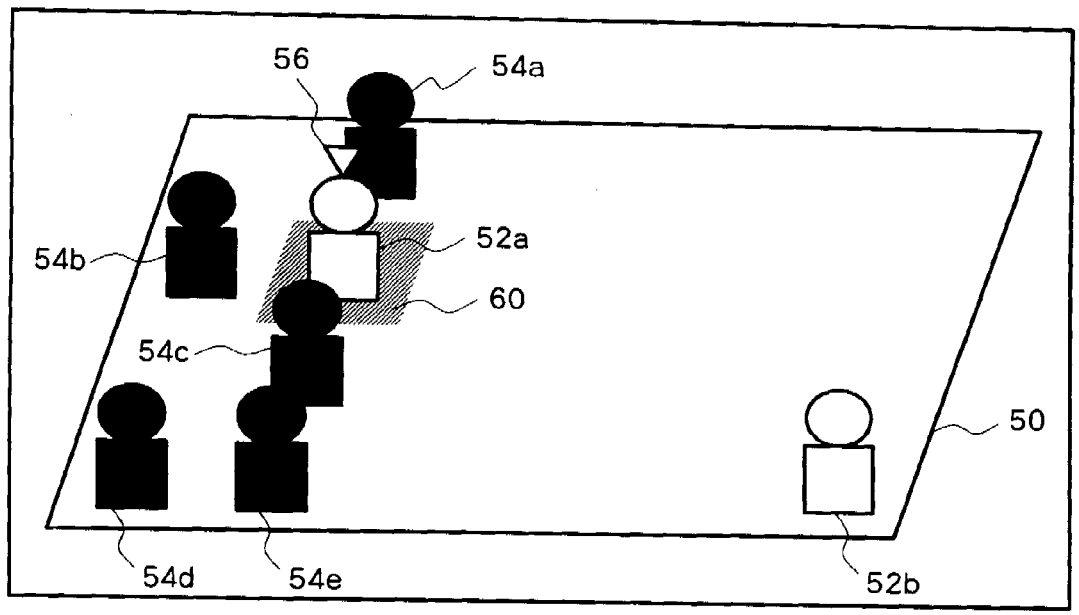
FIG. 6 is a diagram showing an example of a game screen.

In the game screen shown in FIG. 4 or FIG. 5, when a predetermined determination operation (e.g., depression operation of the button 38A) is performed, a moving destination position candidate at that point (i.e., a position pointed by the cursor image 60 at that point) is determined as a moving destination position. Then, for example, a game screen shown in FIG. 6 is displayed.

Figure 7:
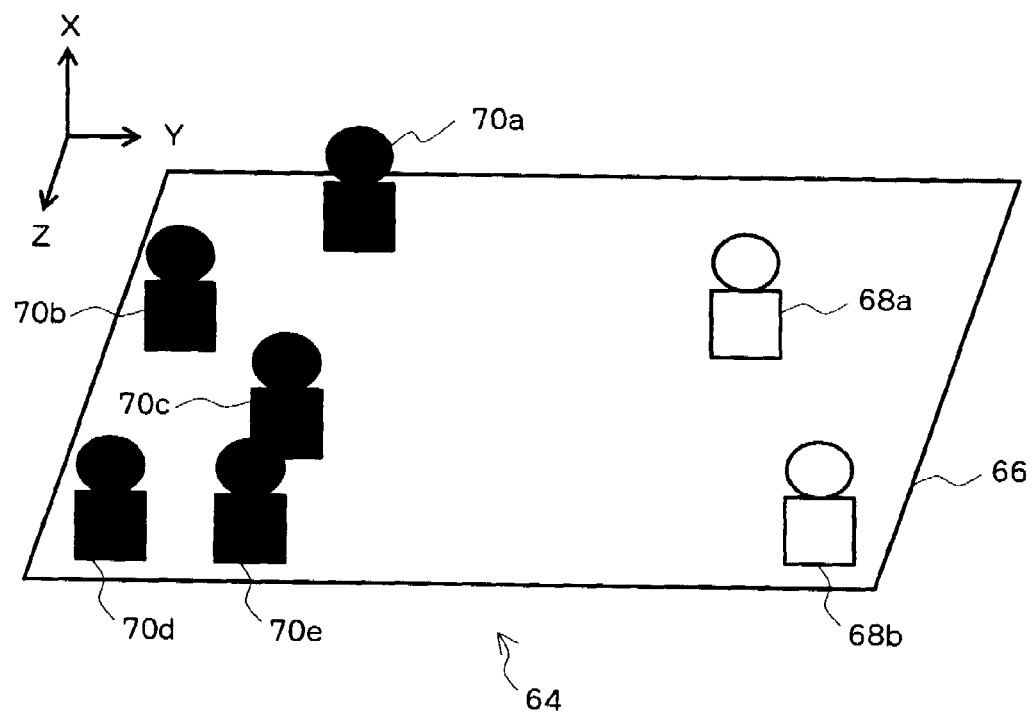
FIG. 7 is a perspective view showing an example of a virtual three-dimensional space.
Figure 8:
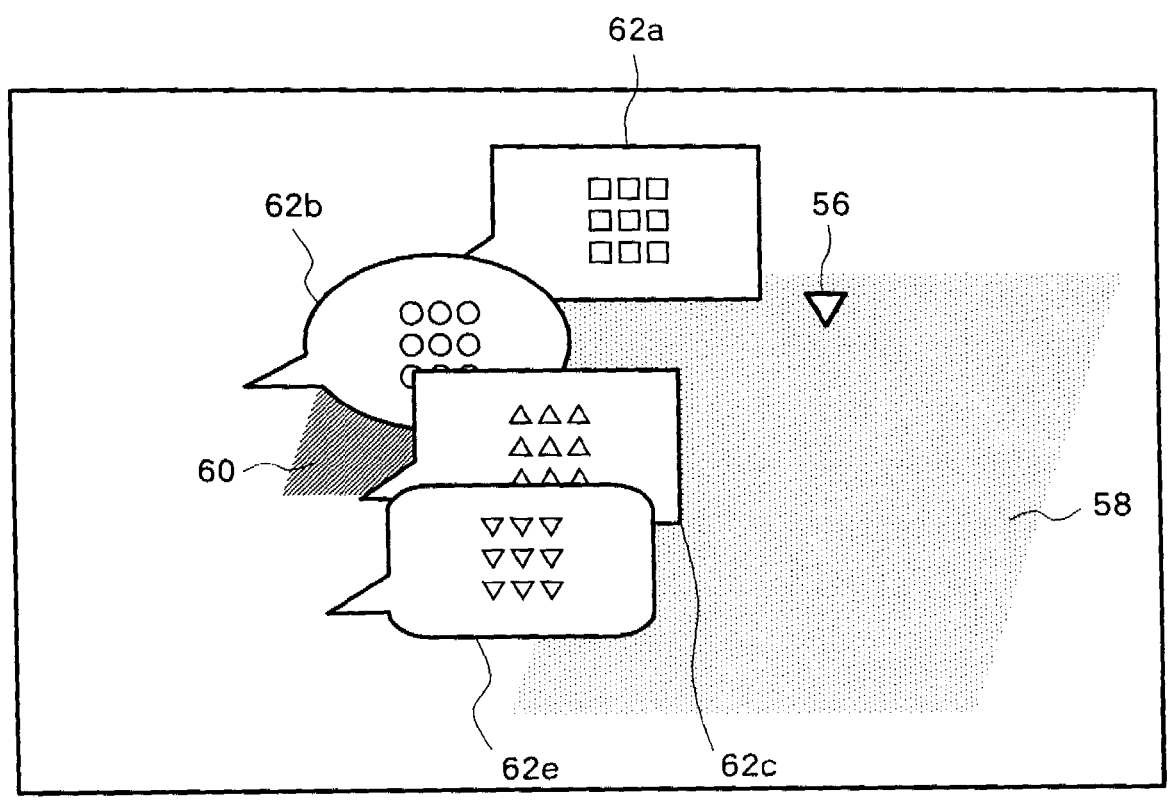
FIG. 8 is a diagram showing an example of an image for synthesis.

A virtual three-dimensional space as illustrated in FIG. 7 is constructed in the main memory 26 in order to create the game screen. As illustrated in FIG. 6, a game field object 66 is arranged in the virtual three-dimensional space 64. Further, player unit objects 68a and 68b and enemy unit objects 70a, 70b, 70c, 70d, and 70e are arranged on the game field object 66. The game device 10 creates a field-of-view image obtained by viewing the virtual three-dimensional space 64 from a given viewpoint in a given sight line direction. Moreover, the game device 10 creates a full-transparency image for synthesis, which has the same size as the field-of-view image. The image for synthesis is attached with the marker image 56, the movable range guide image 58, the cursor image 60, the balloon image 62a, and the like. The image for synthesis is eventually organized into an image as illustrated in FIG. 8. Then, an image obtained by synthesizing the field-of-view image and the image for synthesis is created in the VRAM of the game device 10. The image created in the VRAM is displayed as the game screen on the monitor 18 at a predetermined timing.

Figure 9:
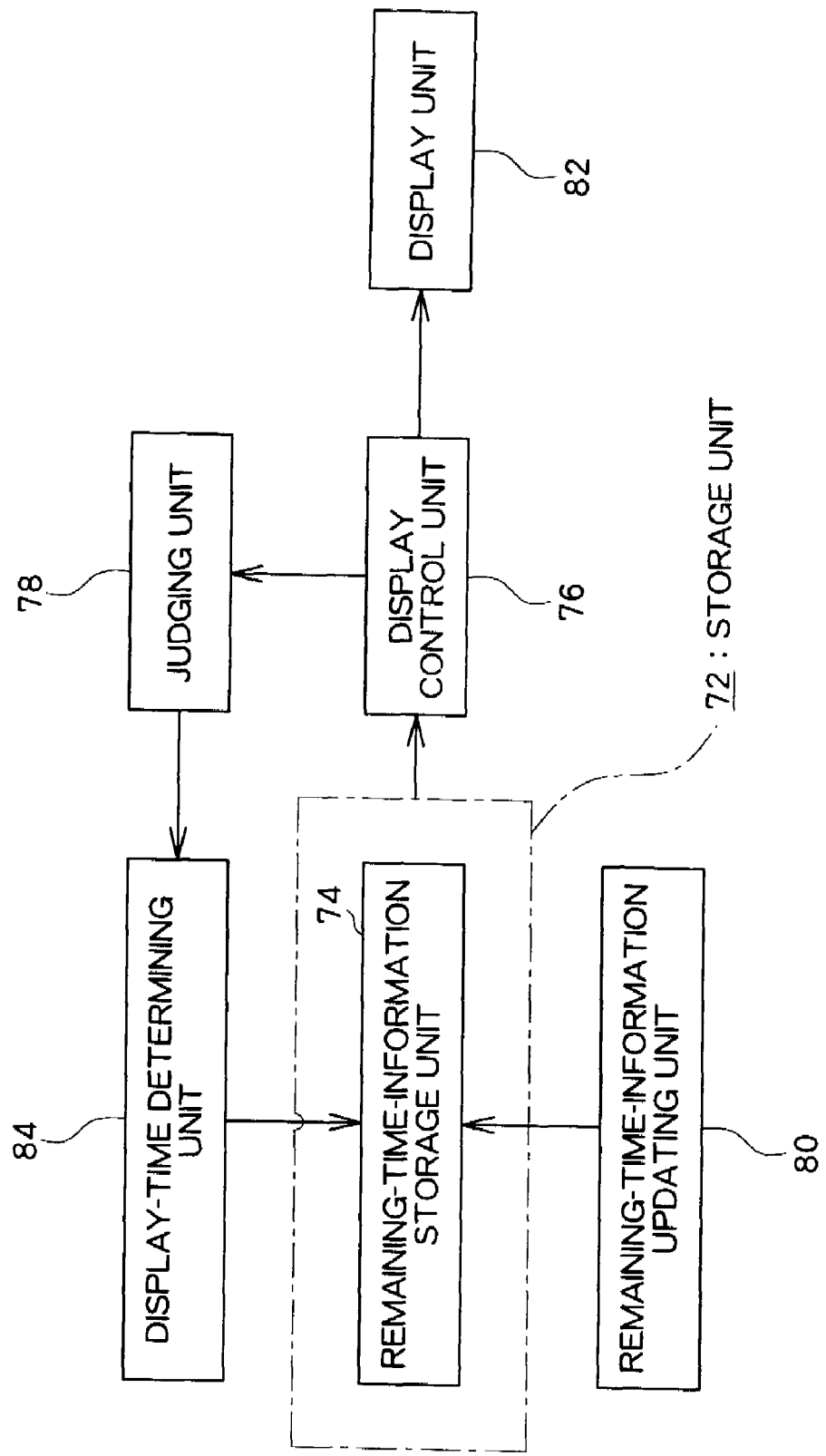
FIG. 9 is a diagram showing functional blocks of the game device according to the embodiment.

Given herein is a description of a functional configuration of the game device 10. FIG. 9 mainly shows functional blocks related to the present invention in the functional blocks realized in the game device 10. As shown in FIG. 9, the game device 10 includes a storage unit 72, a display control unit 76, a judging unit 78, a display-time determining unit 84, a remaining-time-information updating unit 80, and a display unit 82. Those functions are realized by the microprocessor 14 executing the program supplied via the DVD-ROM 25.

[1. Storage Unit]

The storage unit 72 is mainly realized by the DVD-ROM 25 and the main memory 26.

The storage unit 72 stores data concerning the player units and the enemy units. For example, parameter information, object data, and the like of the respective units are stored in the storage unit 72. In this embodiment, for example, a unit table shown in FIG. 10 is stored in the storage unit 72. The unit table shown in the figure includes an ID field, a current position field, a hit point field, a moving ability field, an attacking ability field, a possible attack range field, and a defensive ability field. In the ID field, identification information (ID) for uniquely identifying the respective units is stored. In the figure, a first character of the ID plays a role of information indicating whether a unit identified by the ID is a player unit (P) or an enemy unit (E).

The current position field stores information specifying the current position of the unit. The current position field may also store information specifying a position of the unit on the game screen (i.e., unit image display position) or may further store information specifying a position of the unit in the virtual three-dimensional space 64 (i.e., unit object position). This embodiment will give an exemplification on the assumption that the information specifying the position of the unit in the virtual three-dimensional space 64 is stored in the current position field.

The hit point field stores a hit point of the unit. The hit point is a parameter indicating a physical strength and a vital force of the unit. When the hit point comes to 0, the action instruction for the unit is restricted.

The moving ability field stores a moving ability parameter. The moving ability parameter is defined as numerical information representing a movable distance of the unit in one turn (corresponding to one moving instruction).

The attacking ability field is stored with an attacking ability parameter. The attacking ability parameter is defined as numerical information representing an attacking ability of the unit. For instance, if the player unit attacks the enemy unit, a magnitude of the damage (hit point reduction quantity) to the enemy unit is determined based on the attacking ability parameter of the player unit.

The attackable range field stores an attackable range parameter. The attackable range parameter is defined as numerical information representing an attackable range of the unit. In other words, each player unit can attack the enemy units located within the range determined based on the attackable range parameter from the current position, while each enemy unit can attack the player units located within the range determined based on the attackable range parameter from the current position. Note that the attackable range parameter may also be a parameter indicating a distance on the game screen or may further be a parameter indicating a distance in the virtual three-dimensional space 64. This embodiment will give an exemplification on the assumption that the attackable range parameter indicates the distance in the virtual three-dimensional space 64.

The defending ability field stores a defending ability parameter. The defending ability parameter is defined as numerical information representing a defending ability of the unit. For example, if the player unit attacks the enemy unit, a magnitude of the damage (hit point reduction quantity) to the enemy unit is determined based on the defending ability parameter of the enemy unit. Moreover, if the player unit is attacked by the enemy unit, a magnitude of the damage (hit point reduction quantity) to the player unit is determined based on the defending ability parameter of the player unit.

Figures 11, 12, 13:
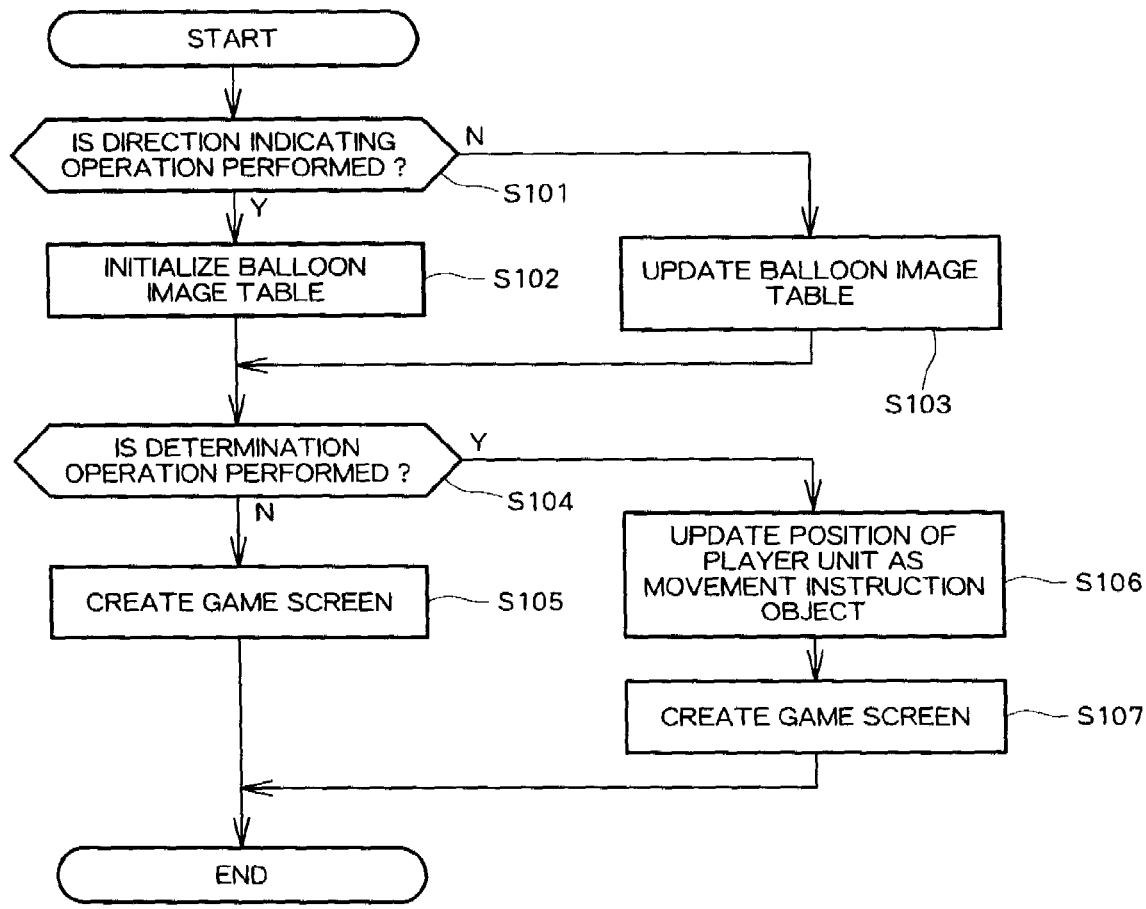
FIG. 11 is a diagram showing an example of a balloon image type table.
FIG. 12 is a diagram showing an example of a balloon image table.
FIG. 13 is a flowchart showing processing executed in the game device.

In this embodiment, for example, a balloon image type table shown in FIG. 11 is stored in the storage unit 72. The balloon image type table shown in the figure includes an ID field, a message character string field, and a shape field. In the ID field, identification information (ID) for uniquely identifying a balloon image type is stored. In the message character string field, a message character string displayed in a balloon is stored. In the shape field, information for specifying a shape of the balloon is stored. In the example in the figure, a shape "1" indicates, for example, a balloon shape related to the balloon image 62e of FIG. 4. A shape "2" indicates, for example, a balloon shape related to the balloon images 62a and 62c of FIG. 4. A shape "3" indicates, for example, a balloon shape related to the balloon image 62b of FIG. 4.

[2. Remaining-Time-Information Storage Unit]

The storage unit 72 includes a remaining-time-information storage unit 74. The remaining-time-information storage unit 74 stores remaining time information corresponding to each of a plurality of balloon images (message images) displayed on a game screen. The remaining time information is information directly or indirectly indicating a remaining time until the display of the balloon images is limited. For example, the remaining time information may be a combination of information indicating a maximum time until the display of the balloon images is limited and information indicating time elapsed from the display of the balloon images.

In this embodiment, for example, a balloon image table shown in FIG. 12 is stored in the remaining-time-information storage unit 74. The balloon image table shown in the figure includes an ID field, a balloon image type ID field, a display position field, a remaining time filed, a depth degree field, and a degree of importance field. In the ID field, information (ID) for uniquely identifying a balloon image displayed on a game screen is stored. In the balloon image type ID field, any one of IDs stored in the ID field of the balloon image type table is stored. In other words, a balloon shape of the balloon image and a message character string displayed in the balloon are specified by this balloon image type ID field. In the display position field, a display position on the game screen of the balloon image is stored. More specifically, a position on the game screen of a representative point of the balloon image is stored. In the remaining time field, information indicating a remaining time until the display of the balloon image is limited. In this embodiment, numerical information indicating the remaining time in units of 1/60 second is stored. As described below, an initial value of the remaining time field is determined for each balloon image by the display-time determining unit 84.

In the depth degree field, a depth degree of the balloon image is stored. In this embodiment, depth degrees of the respective balloon images are indicated by numerical values. As described later, in this embodiment, when at least a part of an area on the game screen corresponding to a certain balloon image and at least a part of an area on the game screen corresponding to another balloon image overlap each other, a balloon image with a smaller depth degree is displayed in front. In other words, the display of at least a part of a balloon image with a larger depth degree is limited by the other balloon image.

In the degree of importance field, information indicating a degree of importance of the balloon image is stored. In this embodiment, degrees of importance of the respective balloon images are indicated by numerical values. Concerning a balloon image with a high degree of importance, a numerical value stored in the degree of importance field is large. For example, a degree of importance of a balloon image may be determined on the basis of an enemy unit to which the balloon image corresponds or may be determined on the basis of a balloon image type of the balloon image. In the former case, for example, a degree of importance of a balloon image corresponding to an important enemy unit may be set high. In the latter case, a degree of importance of a balloon image including an important message image may be set high.

[3. Display Control Unit and Display Unit]

The display control unit 76 is realized mainly with the image processing unit 16. The display unit 82 is realized mainly with the monitor 18. The display control unit 76 causes the game screen containing a plurality of balloon images to be displayed on the display unit 82.

In addition, when at least a part of an area on the screen corresponding to a balloon image (a first balloon image) and at least a part of areas on the screen corresponding to another balloon image (a second balloon image) overlap each other, the display control unit 76 may limit the display of a part of the first balloon image corresponding to the overlapping area on the basis of a degree of importance stored corresponding to the first balloon image and a degree of importance stored corresponding to the second balloon image. In this case, the display control unit 76 may limit the display of the part of the first balloon image corresponding to the overlapping area on the basis of a corrected depth degree obtained by increasing or decreasing a depth degree of the first balloon image by a degree corresponding to a difference between the degree of importance stored corresponding to the first balloon image and the degree of importance stored corresponding to the second balloon image.

An area on the screen corresponding to a balloon image is, for example, an area on the game screen occupied when the entire balloon image is displayed on the game screen.

Moreover, the display control unit 76 displays each of the balloon images over a display time of the balloon image determined by the display-time determining unit 84. In other words, the display control unit 76 displays the balloon image until the display time of the balloon image elapses. It is judged on the basis of remaining time information stored in association with the balloon image whether the display time of the balloon image has elapsed. As a mode of limiting the display of the balloon image, for example, the display of the balloon image on the game screen is inhibited, transparency (translucency) of the balloon image is increased, a depth degree of the balloon image is increased, or the like. In this embodiment, when a value of the remaining time field corresponding to a balloon image decreases to 0, the balloon image is not displayed on the game screen.

[4. Judging Unit]

The judging unit 78 judges, concerning each balloon image to be displayed on the game screen, whether the display of the balloon image is limited by another balloon image. For example, the judging unit 78 judges whether an area on the game screen corresponding to a balloon image and an area on the game screen corresponding to another balloon image overlap each other. Then, the judging unit 78 judges whether the other balloon image is displayed in the overlapping area. In other words, the judging unit 78 judges whether the other balloon image is displayed on at least a part of the balloon image.

[5. Remaining-Time-Information Updating Unit]

The remaining-time-information updating unit 80 updates, every predetermined time (e.g., 1/60 second), remaining time information stored in the remaining-time-information storage unit 74. In this embodiment, a value of the remaining time field of the balloon image table is decreased every predetermined time.

[6. Display-Time Determining Unit]

The display-time determining unit 84 determines a display time (a display period) of each balloon image to be displayed on the game screen. In other words, the display-time determining unit 84 determines an initial state of remaining time information stored in association with each balloon image. In this embodiment, an initial value of the remaining time field of the balloon image table is determined by the display-time determining unit 84.

A display time of each balloon image is determined on the basis of a result of judgment by the judging unit 78. For example, when it is judged that the display of at least a part of a balloon image (a first balloon image) is limited by another balloon image (a second balloon image), a display time of the first balloon image is determined on the basis of a display time of the second balloon image. In this embodiment, a time obtained by adding a display time of the second balloon image to a reference display time (a normal display time) of the first balloon image is determined as a display time of the first balloon image.

For example, in the game screen shown in FIG. 4, another balloon image is not displayed to be superimposed on the balloon image 62e. In this case, a referenced is playtime (T0) is determined as a display time (Te) of the balloon image 62e. On the other hand, the balloon image 62e is displayed to be superimposed on the balloon image 62c. In this case, a time obtained by adding the display time (Te) of the balloon image 62e to the reference display time (T0) is determined as a display time (Tc) of the balloon image 62c. In other words, the display time (Tc) of the balloon image 62c is determined as Tc=2×T0. Similarly, since the balloon image 62c is displayed to be superimposed on the balloon image 62b, a time obtained by adding the display time (Tc) of the balloon image 62c to the reference display time (T0) is determined as a display time (Tb) of the balloon image 62b. In other words, the display time (Tb) of the balloon image 62b is determined as Tb=3×T0. Similarly, since the balloon image 62b is displayed to be superimposed on the balloon image 62a, a time obtained by adding the display time (Tb) of the balloon image 62b to the reference display time (T0) is determined as a display time (Ta) of the balloon image 62a. In other words, the display time (Ta) of the balloon image 62a is determined as Ta=4×T0. In this way, in the game screen shown in FIG. 4, the display times of the respective balloon images are determined as Te<Tc<Tb<Ta.

Therefore, in the game screen shown in FIG. 4, when the time Te (T0) elapses after the screen is displayed, first, the balloon image 62e disappears from the game screen. Thereafter, when the time T0 further elapses, i.e., when the time Tc elapses after the game screen is displayed, the balloon image 62c disappears from the game screen. Thereafter, when the time T0 further elapses, i.e., when the time Tb elapses after the game screen is displayed, the balloon image 62b disappears from the game screen. When the time T0 further elapses, i.e., when the time Ta elapses after the game screen is displayed, the balloon image 62a disappears from the game screen.

The reference display time (T0) may be different for each balloon image. For example, the reference display time (T0) may be determined on the basis of a degree of importance of each balloon image.

Processing executed every predetermined time (e.g., 1/60 second) in the game device 10 will be explained. Here, processing executed, in particular, after a movement instruction object player unit is selected, until a moving destination position of the movement instruction object player unit is determined, will be explained. In other words, processing executed in order to display the game screens shown in FIGS. 3 to 6 will be explained. FIG. 13 is a flowchart showing the processing.

As shown in FIG. 13, in the game device 10, first, it is judged whether a direction indicating operation has been performed (S101). In other words, it is judged whether operation for updating a position of the cursor image 60 has been performed. This judgment is performed on the basis of an operation signal inputted from the controller 32. For example, it is judged whether an operation signal indicating a depression operation of the direction button 34 is inputted from the controller 32.

Figure 14:
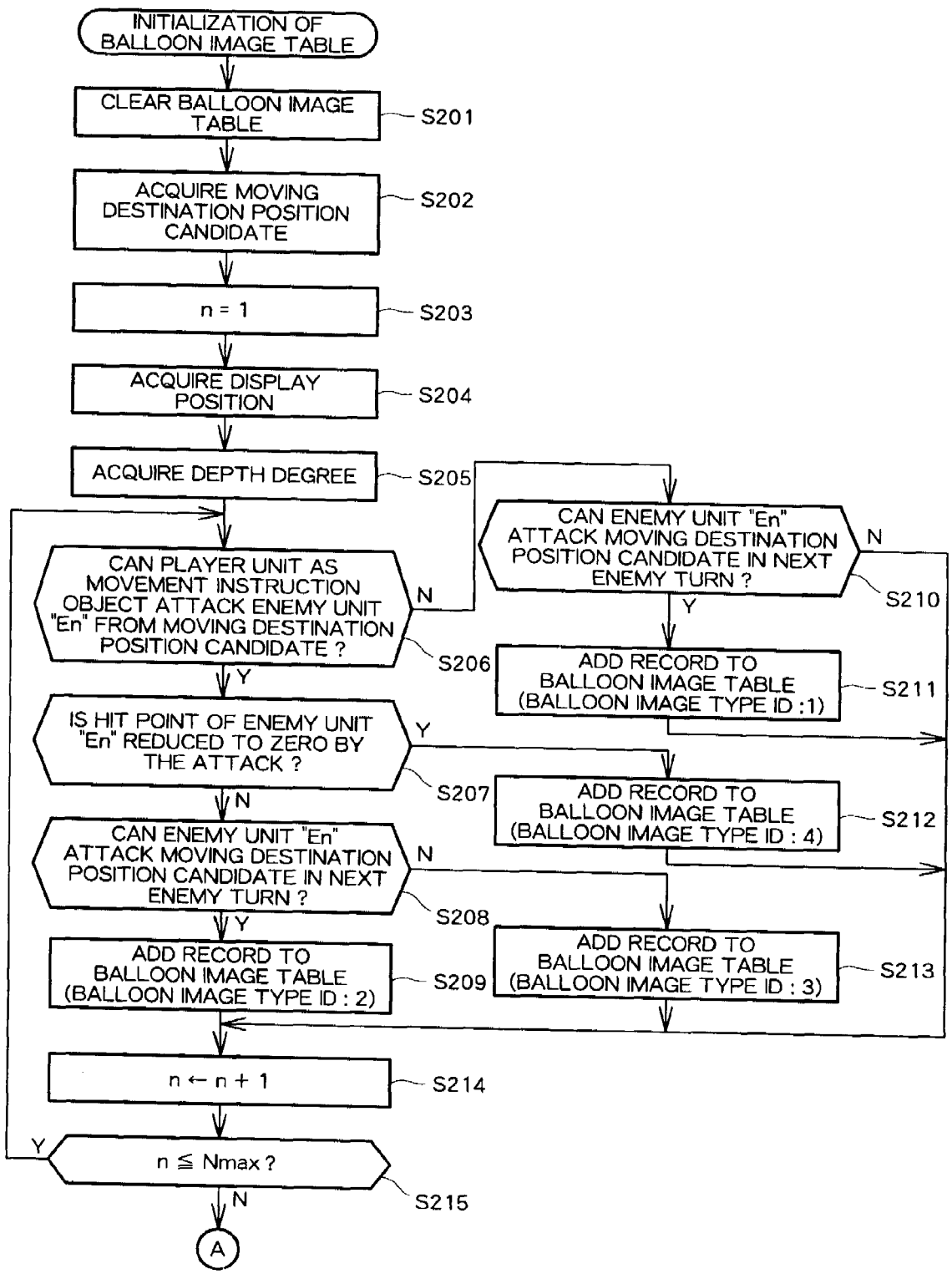
FIG. 14 is a flowchart showing processing executed in the game device.
Figure 15:
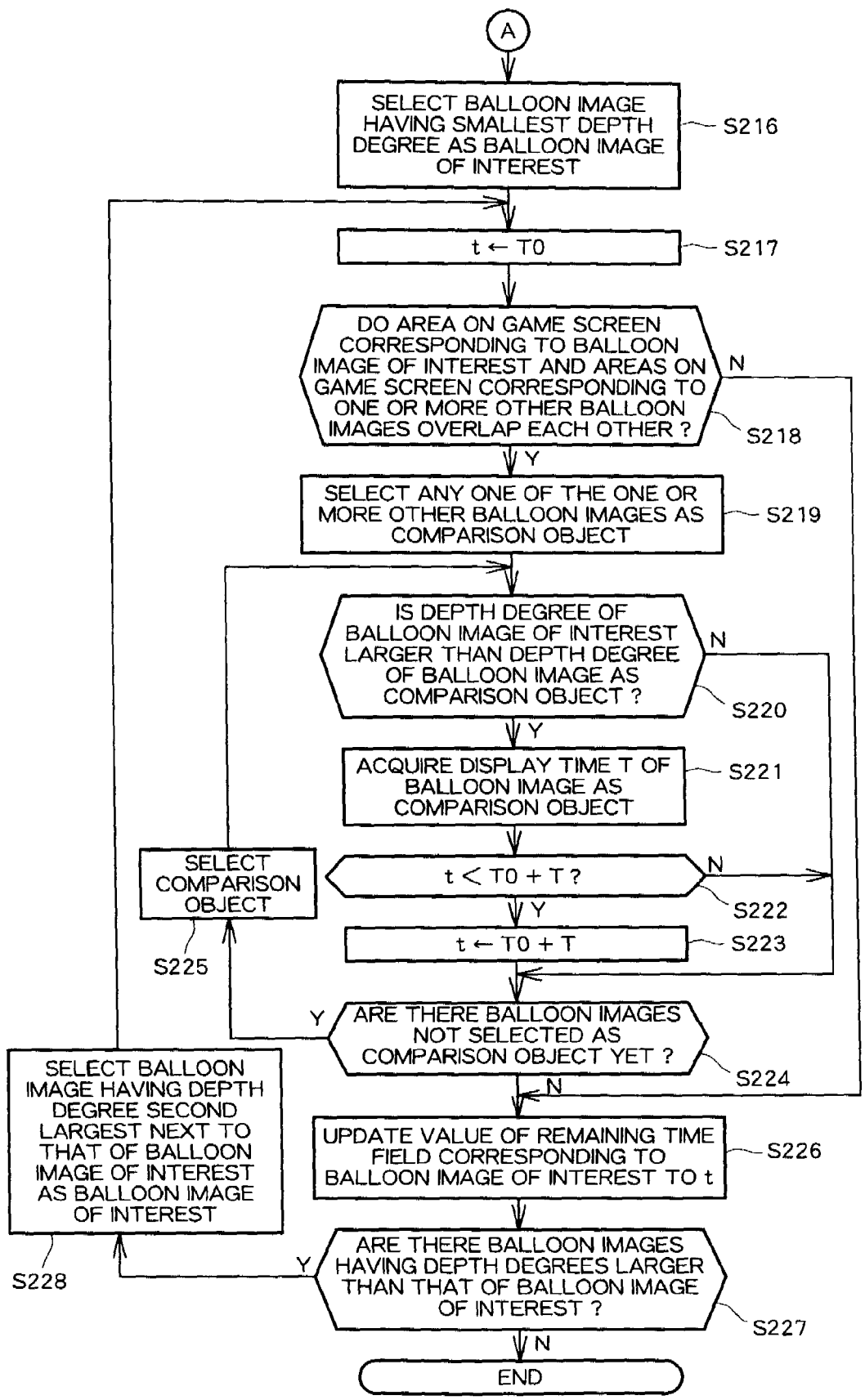
FIG. 15 is a flowchart showing processing executed in the game device.

When it is judged that the direction indicating operation has been performed, the display control unit 76 executes processing for initializing the balloon image table (S102). FIGS. 14 and 15 are flowcharts showing the processing for initializing the balloon image table.

As shown in FIG. 14, in this processing, first, contents of the balloon image table are cleared (S201). Specifically, all records (data) of the balloon image table are deleted. Subsequently, the display control unit 76 acquires a moving destination position candidate (S202). The display control unit 76 holds information for specifying a present moving destination position candidate (hereinafter, referred to as moving destination position candidate information). The display control unit 76 acquires content of the direction indicating operation on the basis of an operation signal inputted from the controller 32 and sets a position obtained by moving the present moving destination position candidate by a predetermined distance in a direction corresponding to the content of the direction indicating operation as a new moving destination position candidate. The display control unit 76 updates the moving destination position candidate information.

Subsequently, the display control unit 76 initializes a variable n (S203) to 1. The display control unit 76 executes processing of Steps S204 to S213 with an enemy unit having an ID "En" (hereinafter, referred to as an enemy unit "En") as an object.

The display control unit 76 acquires a display position of an enemy unit image corresponding to the enemy unit "En" (hereinafter, referred to as enemy unit image "En") (S204). Specifically, the display control unit 76 reads out a position in a virtual three-dimensional space 64 of an enemy unit object corresponding to the enemy unit "En" (hereinafter, referred to as enemy unit object "En") from the current position field of the unit table and acquires a position on the game screen corresponding to the position as a display position of the enemy unit image "En".

The display control unit 76 acquires a depth degree corresponding to the enemy unit image "En" (S205). The depth degree corresponding to the enemy unit image "En" is calculated on the basis of a distance from a viewpoint position in the virtual three-dimensional space 64 to the position of the enemy unit object "En". In this embodiment, the depth degree corresponding to the enemy unit image "En" increases as the distance from the viewpoint position to the position of the enemy unit object "En" increases. As described later, the depth degree acquired in this step is stored in the depth degree field of the balloon image table as a depth degree of a balloon image corresponding to the enemy unit "En".

After that, the display control unit 76 judges whether the movement instruction object player unit can attack the enemy unit "En" from the moving destination position candidate (S206). The display control unit 76 reads out a possible attack range parameter of the movement instruction object player unit. The display control unit 76 acquires, on the basis of this possible attack range parameter and the moving destination position candidate information, a range in which the movement instruction object player unit can attack from the moving destination position candidate. The display control unit 76 reads out a current position of the enemy unit "En" and judges whether the current position is included in the possible attack range. When it is judged that the current position of the enemy unit "En" is included in the possible attack range, the display control unit 76 judges that the movement instruction object player unit can attack the enemy unit "En" from the moving destination position candidate.

When it is judged that the movement instruction object player unit cannot attack the enemy unit "En" from the moving destination position candidate, the display control unit 76 judges whether the enemy unit "En" can attack the moving destination position candidate (more precisely, a player unit located in the moving destination position candidate) in the next enemy's turn (S210). The display control unit 76 reads out a moving ability parameter and a possible attack range parameter of the enemy unit "En" from the unit table. The display control unit 76 judges, on the basis of these parameters, whether the enemy unit "En" can move, in the next enemy's turn, to a position where the enemy unit "En" can attack the moving destination position candidate. When it is judged that the enemy unit "En" can perform such movement, the display control unit 76 judges that the enemy unit "En" can attack the moving destination position candidate in the next enemy's turn.

When it is judged that the enemy unit "En" can attack the moving destination position candidate in the next enemy's turn, the display control unit 76 adds a record to the balloon image table (S211). In this case, 1 is stored in the balloon image type ID field of a newly added record. In the ID field, a value obtained by adding 1 to the number of record stored in the balloon image table is stored. For example, when no record is stored in the balloon image table, 1 is stored in the ID field. In the display position field, information indicating a display position determined on the basis of the display position of the enemy unit image "En" acquired in Step S204 is stored. In the depth degree field, the depth degree acquired in Step S205 is stored. The degree of importance field, information indicating a predetermined degree of importance corresponding to the enemy unit "En" or the balloon image type ID "1" is stored. Note that a value to be stored in the remaining time field is determined in processing steps (S216 to S228) described below.

On the other hand, when it is judged in Step S206 that the movement instruction object player unit can attack the enemy unit "En" from the moving destination position candidate, the display control unit 76 judges whether a hit point of the enemy unit "En" is reduced to zero by the attack (S207). The display control unit 76 reads out a defensive ability parameter and a hit point (a hit point residual amount) of the enemy unit "En". The display control unit 76 reads out an attacking ability parameter of the movement instruction object player unit. The display control unit 76 calculates a damage amount (a hit point decrease amount) due to the attack by comparing the defensive ability parameter of the enemy unit "En" and the attacking ability parameter of the movement instruction object player unit. The display control unit 76 judges whether the hit point decrease amount is equal to or larger than the hit point residual amount of the enemy unit "En".

When it is judged that the hit point of the enemy unit "En" decreases to zero, the display control unit 76 adds a record to the balloon image table (S212). In this case, 4 is stored in the balloon image type ID field of the newly added record. In the other fields, various kinds of information are stored as in the processing of Step S211.

On the other hand, when it is judged that the hit point of the enemy unit "En" does not decrease to zero (S207), the display control unit 76 judges whether the enemy unit "En" can attack the moving destination position candidate (more precisely, the player unit located in the moving destination position candidate) in the next enemy's turn (S208). This processing is performed in the same manner as the processing of Step S210.

When it is judged that the enemy unit "En" can attack the moving destination position candidate in the next enemy's turn, the display control unit 76 adds a record in the balloon image table (S209). In this case, 2 is stored in the balloon image type ID field of the newly added record. In the other fields, various kinds of information are stored as in the processing of Step S211.

On the other hand, when it is judged that the enemy unit "En" cannot attack the moving destination position candidate in the next enemy's turn, the display control unit 76 adds a record to the balloon image table (S213). In this case, 3 is stored in the balloon image type ID field of the newly added record. In the other fields, various kinds of information are stored as in the processing of Step S211.

After executing the processing of Steps S204 to S213 on the enemy unit "En", the display control unit 76 increments the variable n (S214). The display control unit 76 judges whether the variable n is equal to or smaller than Nmax (S215). Nmax is a predetermined constant indicating a total number of enemy units. In this embodiment, Nmax is 5. When it is judged that the variable n is equal to or smaller than Nmax, the display control unit 76 executes the processing of Steps S204 to S213 on the enemy unit "En".

On the other hand, when it is judged that the variable "n" is larger than Nmax, processing for determining an initial value of the remaining time field corresponding to each balloon image (a display time of each balloon image) is executed by the display-time determining unit 84. In this processing, first, a balloon image having a smallest depth degree is selected as a balloon image of interest (S216). In other words, a balloon image displayed front most on the game screen is selected as a balloon image of interest.

Subsequently, the variable t is initialized to a predetermined value T0 (S217). T0 is a value indicating a reference display time by a unit of 1/60 second. As described above, a value of T0 may be different for each balloon image.

Subsequently, it is judged whether at least a part of an area on the game screen corresponding to the balloon image of interest and at least a part of areas on the game screen corresponding to one or more other balloon images overlap each other (S218). An area on the game screen corresponding to a balloon image is an area on the game screen occupied when the entire balloon image is displayed on the game screen. The balloon image is an image in which a message character string (a message character string field of the balloon image type table) specified by the balloon image type ID field of the balloon image table is included in a balloon of a shape (a shape field of the balloon image type table) specified by the field. Therefore, an area on the game screen corresponding to the balloon image is acquired on the basis of the display position field and the balloon image type ID field of the balloon image table.

When it is judged that at least a part of the area on the game screen corresponding to the balloon image of interest and at least a part of the areas on the game screen corresponding to the one or more other balloon images overlap each other, any one of the one or more other balloon images is selected as a comparison object (S219). It is judged whether a depth degree of the balloon image of interest is larger than a depth degree of the balloon image as the comparison object (S220). In other words, it is judged whether the display of the balloon image of interest is limited by the balloon image as the comparison object.

When it is judged that the depth degree of the balloon image of interest is larger than the depth degree of the balloon image as the comparison object, a display time T of the balloon image as the comparison object is acquired (S221). Specifically, a value of the remaining time field corresponding to the balloon image as the comparison object is acquired as T. In this embodiment, initial values of the remaining time field are determined in order from a balloon image having a smallest depth degree according to the processing of Steps S216 to S228. In other words, when the display of at least a part of a certain balloon image is limited by another balloon image, an initial value of the remaining time field corresponding to the other balloon image is determined first. Therefore, a value of the remaining time field corresponding to the balloon image as the comparison object has already been determined.

Subsequently, it is judged whether a value of the variable t is smaller than T0+T (S222). When the value of the variable t is smaller than T0+T, the value of the variable t is updated to T0+T (S223). In this embodiment, when the display of at least a part of a balloon image is limited by a plurality of other balloon images, a display time of the balloon image is determined on the basis of a longest display time among display times of the plurality of other balloon images according to the processing of these steps.

Subsequently, it is judged whether one or more balloon images that partially overlap at least a part of the area on the game screen corresponding to the balloon image of interest are present other than the balloon image already set as the comparison object (S224). When such balloon images are present, any one of the balloon images are selected as a comparison object (S225) and the processing of Steps S220 to S224 is executed.

On the other hand, when a balloon image that overlaps at least a part of the area on the game screen corresponding to the balloon image of interest is not present other than the balloon image already set as the comparison object, the value of the variable t is stored in the remaining time field corresponding to the balloon image of interest (S226). It is judged whether one or more balloon images having depth degrees larger than that of the balloon image of interest are present (S227).

When one or more balloon images having depth degrees larger than that of the balloon image of interest are present, a balloon image having a depth degree second largest next to that of the balloon image of interest is selected as a new balloon image of interest (S228) and the processing of Steps S217 to S227 is executed. On the other hand, when a balloon image having a depth degree larger than that of the balloon image of interest is not present, the processing for initializing the balloon image table is finished.

Figure 16:
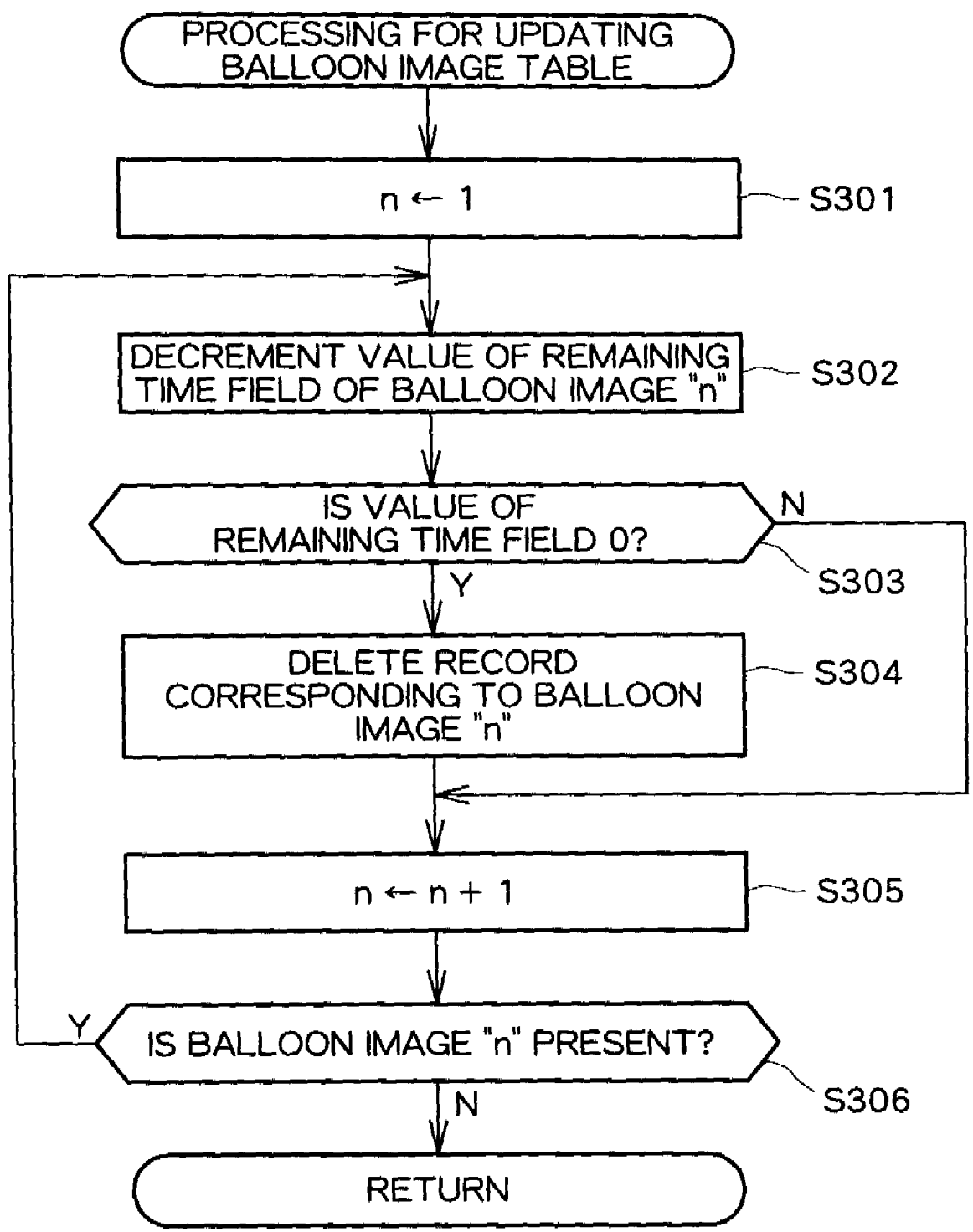
FIG. 16 is a flowchart showing processing executed in the game device.

In Step S101 shown in FIG. 13, when it is judged that the direction indicating operation has not been performed, the display control unit 76 updates the balloon image table (S103). FIG. 16 is a flowchart showing processing for updating the balloon image table.

As shown in FIG. 16, in this processing, first, the variable n is initialized to 1 (S301). Processing of Steps S302 to S306 is executed with a balloon image with an ID "n" (hereinafter referred to as balloon image "n") as an object.

The remaining-time information updating unit 80 decrements a value of the remaining time field corresponding to the balloon image "n" in the balloon image table (S302). The display control unit 76 judges whether the value of the remaining time field is 0 (S303). When it is judged that the value of the remaining time field is 0, the display control unit 76 deletes a record corresponding to the balloon image "n" in the balloon image table (S304). In this case, the balloon image "n" is not displayed on the game screen.

When the processing of Steps S302 to S304 is executed with the balloon image "n" as an object, a value of the variable n is incremented (S305). It is judged whether the balloon image "n" is present (S306). When it is judged that the balloon image "n" is present, the processing of Steps S302 to S305 is executed with the balloon image "n" as an object. On the other hand, when it is judged that the balloon image "n" is not present, the processing for updating the balloon image table is finished.

After executing the processing for initializing the balloon image table (S102) or the processing for updating the balloon image table (S103), the display control unit 76 judges whether determination operation has been performed (S104). This judgment is performed on the basis of an operation signal inputted from the controller 32. For example, it is judged whether an operation signal indicating that the button 38A is depressed and an operation signal indicating that the depression is released are inputted from the controller 32.

When it is judged that the determination operation has not been performed, the display control unit 76 creates a game screen as follows (S105). First, a field-of-view image is created. More specifically, a field-of-view image obtained by viewing a "virtual three-dimensional space in which player unit objects and enemy unit objects are arranged on the basis of content (the current position field) of the unit table" from a given viewpoint is created.

An image for synthesis is created. Specifically, an image for synthesis that has the same size as the visual field image and is transparent over the entire surface thereof is created. After that, the movable range guide image 58 is added to the image for synthesis. The movable range guide image 58 is rendered to indicate a movable range of the movement instruction object player unit on the basis of a current position and a moving ability parameter of the movement instruction object player unit. The cursor image 60 is added to the image for synthesis. A rendering position of the cursor image 60 is determined on the basis of the moving destination position candidate information held by the display control unit 76. The marker image 56 is added to the image for synthesis. A rendering position of the marker image 56 is determined on the basis of the current position of the movement instruction object player unit.

Further, balloon images are added to the image for synthesis on the basis of the balloon image table. Each of the balloon images is an image in which a message character string specified by the balloon image type ID field (the message character string field of the balloon image type table) is included in a balloon of a shape specified by the field (the shape field of the balloon image type table). Rendering positions of the respective balloon images are specified by the display position field of the balloon image table. In this case, the balloon images are added to the image for synthesis in order from one having a large value of the depth degree field.

The display control unit 76 creates, in the VRAM, an image obtained by synthesizing the field-of-view image and the image for synthesis. The image created in the VRAM is displayed on the display unit 82 as a game screen at predetermined timing.

When it is judged that the determination operation has been performed (S104), the display control unit 76 updates a position of the movement instruction object player unit (S106). More specifically, a position indicated by the moving destination position candidate information held by the display control unit 76 is stored in the current position field of the movement instruction object player unit of the unit table.

After that, the display control unit 76 creates a game screen on the VRAM (S107). Specifically, a field-of-view image obtained by viewing a "virtual three-dimensional space in which player unit objects and enemy unit objects are arranged on the basis of content (the current position field) of the unit table" from a given viewpoint is created. An image for synthesis that has the same size as the field-of-view image and is transparent over the entire surface thereof is created. The marker image 56 and the cursor image 60 are added to the image for synthesis. An image obtained by synthesizing the field-of-view image and the image for synthesis is created on the VRAM. The image created on the VRAM is displayed on the display unit 82 as a game screen at predetermined timing.

The processing explained above is realized as a game program read out from the DVD-ROM 25 is executed by the microprocessor 14.

As explained above, in the game device 10, display times are set for respective balloon images and, when another balloon image is displayed to overlap an balloon image, a display time of the balloon image is set longer than a display time of the another balloon image. As a result, according to the game device 10, the balloon images disappear in order from one displayed in the foreground of the game screen. Even when balloon images are displayed to overlap one another, the player can suitably grasp contents of the respective balloon images.

When at least apart of an area on the game screen corresponding to a balloon image (a first balloon image) overlaps at least a part of another balloon image (a second balloon image), a depth degree of the first balloon image may be corrected on the basis of a degree of importance of the first balloon image and a degree of importance of the second balloon image. A degree of importance of a balloon image is determined on the basis of content of description of the balloon image. For example, a degree of importance of a balloon image including content that is important in terms of a story of a game is set high. For example, a degree of importance of a balloon image indicating that a player unit is likely to be attacked by an enemy unit in the next enemy's turn is set high.

Figure 17:
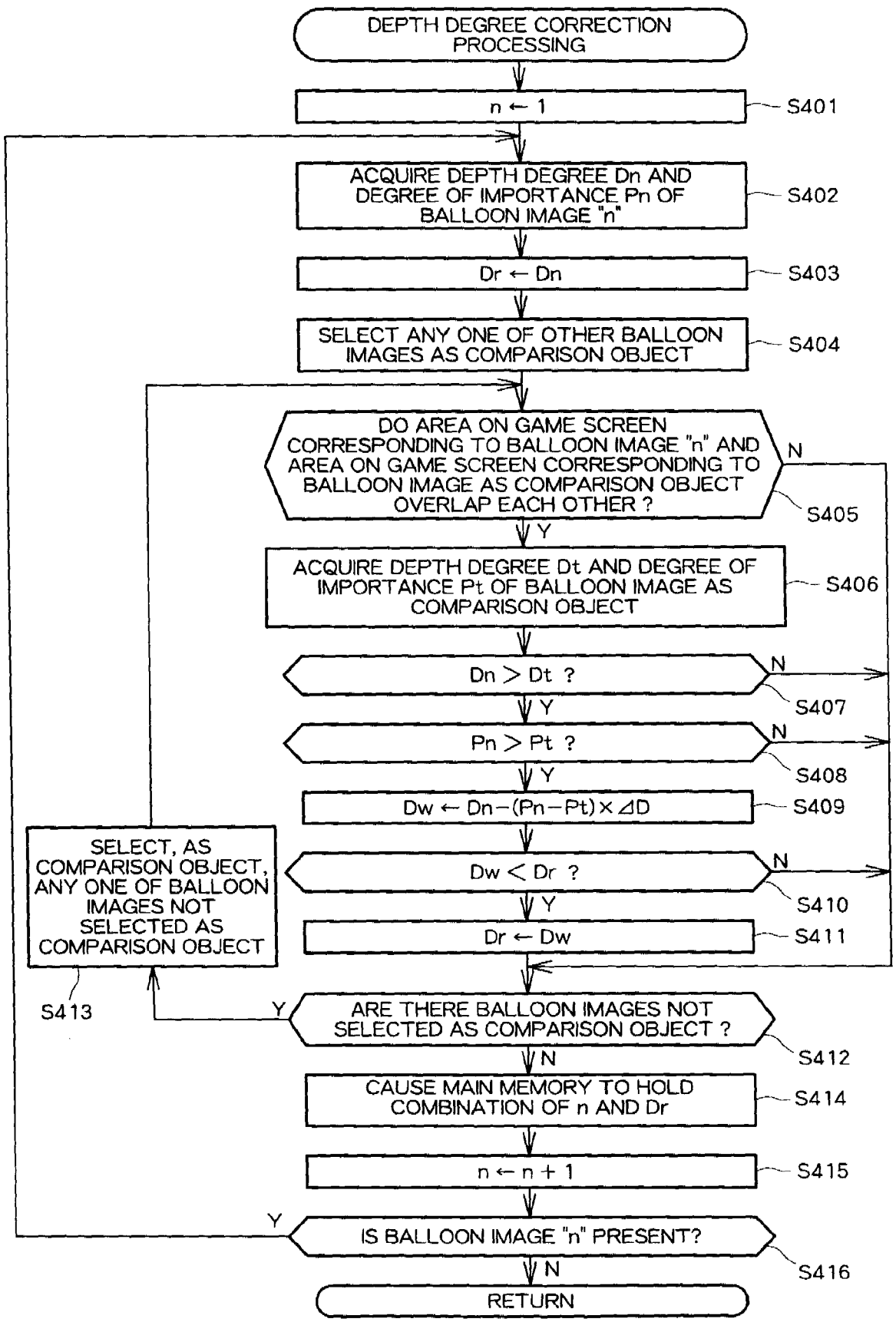
FIG. 17 is a flowchart showing processing executed in the game device.

FIG. 17 is a flowchart showing depth degree correction processing for correcting depth degrees of respective balloon images. This depth degree correction processing may be executed only after it is judged in Step S215 in FIG. 14 that the variable n is larger than Nmax and before the processing of Step S216 in FIG. 15 is executed.

As shown in FIG. 17, in the depth degree correction processing, first, the variable n is initialized to 1 (S401). Subsequently, a depth degree Dn and a degree of importance Pn of the balloon image "n" is acquired (S402). The depth degree Dn is a numerical value stored in the depth degree field of a record corresponding to the balloon image "n" in the balloon image table. Similarly, the degree of importance Pn is a numerical value stored in the degree of importance field of a record corresponding to the balloon image "n" in the balloon image table. A value of Dn is substituted for a correction depth degree Dr (S403).

Subsequently, any one of the balloon images other than the balloon image "n" is selected as a comparison object (S404). It is judged whether at least a part of an area on the game screen corresponding to the balloon image "n" and at least a part of an area on the game screen corresponding to the balloon image as the comparison object overlap each other (S405). This judgment is performed in the same manner as the processing of Step S218 in FIG. 15.

When it is judged that at least a part of the area on the game screen corresponding to the balloon image "n" and at least a part of the area on the game screen corresponding to the balloon image as the comparison object overlap each other, a depth degree Dt and a degree of importance Pt of the balloon image as the comparison object are acquired (S406). The acquisition of the depth degree Dt and the degree of importance Pt is performed in the same manner as the processing of Step S402.

It is judged whether Dn is larger than Dt (S407). In other words, it is judged whether the balloon image as the comparison object is displayed in front of the balloon image "n". When it is judged that Dn is larger than Dt, it is further judged whether Pn is larger than Pt (S408). In other words, it is judged whether the balloon image "n" is more important than the balloon image as the comparison object.

When it is judged that Pn is larger than Pt, a corrected depth degree candidate Dw is calculated (S409). Dw is calculated in accordance with an expression $Dw=Dn-(Pn-Pt)\times \Delta D$. Here, $\Delta D$ is a predetermined constant. It is judged whether Dw is smaller than Dr (S410). When it is judged that Dw is smaller than Dr, a value of Dw is substituted for Dr (S411).

After that, it is judged whether balloon images that are balloon image other than the balloon image "n" and are not selected as a comparison object yet are present (S412). When it is judged that such balloon images are present, any one of the balloon images is selected as a comparison object (S413). In this case, the processing of Steps S405 to S411 is executed with the newly selected balloon image as a comparison object. On the other hand, when it is judged that balloon images that are balloon images other than the balloon image "n" and are not selected as a comparison object yet are not present, a combination of values of n and Dr is held in the main memory 26 (S414).

When the processing of Steps S402 to S414 is executed on the balloon image "n", the variable n is incremented (S415) and it is judged whether the balloon image "n" is present (S416). When it is judged that the balloon image "n" is present, the processing of Steps S402 to S415 is executed with the balloon image "n" as an object. On the other hand, when it is judged that the balloon image "n" is not present, the depth degree correction processing is finished.

The processing explained above is also realized as the game program read out from the DVD-ROM 25 is executed by the microprocessor 14.

When the depth degree correction processing is executed, a corrected depth degree (Dr) is calculated for each of the balloon images and held in the main memory 26. When 1) at least a part of the area on the game screen corresponding to the balloon image "n" and at least a part of the area on the game screen corresponding to the other balloon image overlap, 2) the other balloon image is displayed in front of the balloon image "n", and 3) a degree of importance of the other balloon image is lower than a degree of importance of the balloon image "n", the corrected depth degree corresponding to the balloon image "n" is a value obtained by subtracting an amount corresponding to a difference between the degree of importance of the balloon image "n" and the degree of importance of the other balloon image from an original depth degree. When a plurality of other balloon images satisfying the conditions are present, corrected depth degree candidates (Dw) are calculated with the respective balloon images as objects and a minimum value of the corrected depth degree candidates is set as a corrected depth value. When no other balloon image satisfying the conditions is present, a corrected depth degree is the original depth degree.

The corrected depth degree calculated as described above and held in the main memory 26 only has to be used instead of a value of the depth degree field of the balloon image table in the processing for determining the display time of the balloon image (FIG. 15) and the processing for generating a game screen (S105 in FIG. 13).

Consequently, when balloon images are displayed to overlap each other, it is possible to display a balloon image with a high degree of importance in front.

In the case where balloon images are displayed to overlap each other, when a balloon image with a high degree of importance is always displayed in front, the display may be unnatural if a difference of depth degrees of the balloon images is large. For example, when balloon images of a certain enemy unit (a first enemy unit) and an enemy unit (a second enemy unit) arranged in a position further apart from a viewpoint than the first enemy unit are displayed to overlap each other, if the balloon image corresponding to the second enemy unit is displayed in front of the balloon image corresponding to the first enemy unit because a degree of importance of the balloon image corresponding to the second enemy unit is higher than a degree of importance of the balloon image corresponding to the first enemy unit, the display of the balloon images may be unnatural depending on how far apart the second enemy unit is from the viewpoint.

In this regard, in the game device 10, a depth degree corresponds to each of balloon images and, when a balloon image with a lower degree of importance is displayed on a certain balloon image, a depth degree of a balloon image with a high degree of importance is reduced by an amount corresponding to a difference of degrees of importance. As a result, only when a depth degree of the balloon image with the high degree of importance is smaller than a depth degree of the balloon image with the low importance, the balloon image with the high degree of importance is displayed in front. Therefore, the balloon image with the high degree of importance is displayed in front while the unnatural display is prevented from occurring.

The invention is not limited to the embodiment described above.

For example, in the game screen shown in FIG. 4, the balloon image 62b is displayed to be superimposed on the balloon image 62a. However, the display of the balloon image 62a is hardly limited. In such a case, since it is possible to grasp content of the balloon image 62a even if the balloon image 62b is displayed, a display time of the balloon image 62a after the balloon image 62b disappears may be set shorter than usual.

In other words, a display time (Ta) of the balloon image 62a may be determined as Ta=(T0×α)+Tb. Here, α is a numerical value equal to or larger than 0 to equal to or smaller than 1 and a value of α is determined on the basis of a size of a limited display portion (a portion, the display of which is limited by the balloon image 62b) of the balloon image 62a. For example, a value of a may be determined as 1 when an area of the limited display portion of the balloon image 62a is equal to or larger than 20% of a total area of the balloon image 62a and may be determined as 0.8 when the area is smaller than 20% of the total area of the balloon image 62a. In this case, when the area of the limited display portion of the balloon image 62a is smaller than 20% of the total area, the display time (Ta) of the balloon image 62a is determined as Ta=(T0×0.8)+Tb. In other words, the balloon image 62a disappears when a time (T0×0.8) shorter than the normal time (T0) elapses after the balloon image 62b disappears. A value of a may be determined by performing a predetermined arithmetic operation on the basis of the size of the limited display portion of the balloon image 62a.

When display times of the balloon images are determined as described above, in Step S222 in FIG. 15, it may be judged whether a value of the variable t is smaller than (T0×α)+T. In Step S223, the value of the variable t may be updated to (T0×α)+T. A value of α may be determined on the basis of a size of a portion of the balloon image of interest, the display of which is limited by the balloon image as the comparison object, before the processing of Step S222 is executed.

For example, a message image is not limited to a balloon image.

For example, it is also possible to apply the present invention to a game device serving as a terminal of a network game system.

Further, for example, it is also possible to apply the invention to message image display devices other than a game device.

Figure 18:
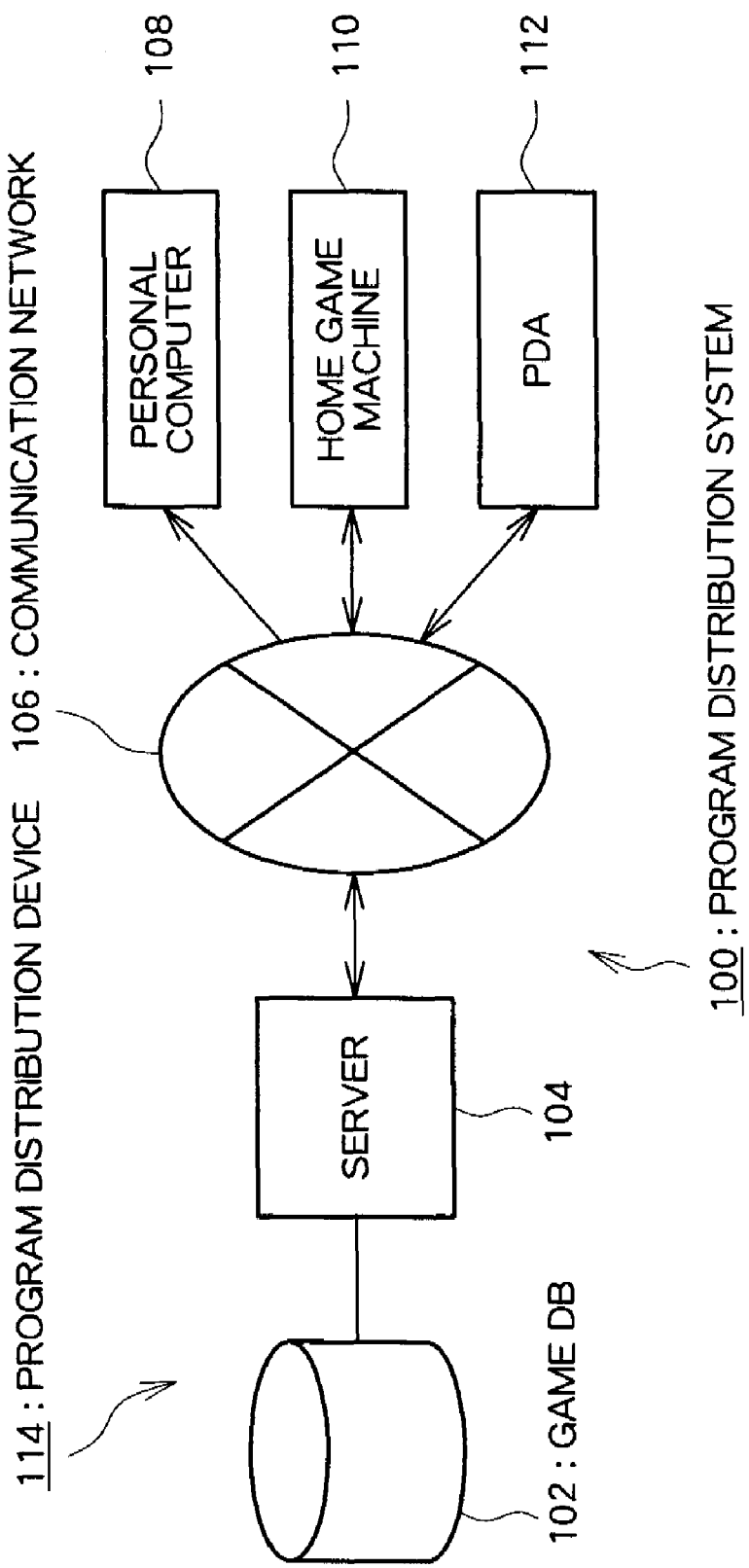
FIG. 18 is a diagram showing an overall structure of a program distribution system according to another embodiment of the present invention.

Still further, in the description given above, the programs are supplied (installed) to the home game machine 11 from the DVD-ROM 25 serving as an information storage medium, and may also be distributed to homes and the like via the communication network. FIG. 18 is a diagram illustrating a whole structure of a program distribution system using the communication network. A program distribution method according to the present invention will be described with reference to FIG. 18. As illustrated in the figure, a program distribution system 100 includes a game database 102, a server 104, a communication network 106, a personal computer 108, a home game machine 110, and a personal digital assistant (PDA) 112. A program distribution device 114 comprises the game database 102 and the server 104. The communication network 106 includes, e.g., the Internet or a cable TV network. In this system, the game database (information recording medium) 102 stores programs identical to the content stored the DVD-ROM 25. Then, a prospective consumer makes a game distribution request by use of the personal computer 108, the home game machine 110, the PDA 112, or the like, whereby the request is transferred to the server 104 via the communication network 106. Then, the server 104 reads the programs from the game database 102 in response to the game distribution request, and transmits the programs to the game distribution requester such as the personal computer 108, the home game machine 110, the PDA 112, etc. Herein, the game is distributed in response to the game distribution request. However, the server 104 may transmit the game one-sidedly. Further, all components of the program necessary to realize a game are not necessarily sent at once (collective distribution), and only a necessary component of the program according to an aspect of the game may be sent (divided distribution). Thus, the game is distributed via the communication network 106, whereby the prospective consumer can easily obtain the programs.

The invention claimed is:

1. A message image display device, comprising:
    means for causing a display to display a screen including a plurality of message images;
    means for judging whether the display of at least a part of a message image is limited by one or more other message images among the plurality of message images; and
    means for determining a display time of each of the plurality of message images on the basis of a result of the judging,
    wherein the means for causing causes the display to display each of the plurality of message images over the display time of the message image determined by the means for determining.

2. A message image display device according to claim 1, wherein
    the means for determining determines, in determining a display time of one message image of the plurality of message images, when it is judged that display of at least a part of the one message image is limited by one or more other message images among the plurality of message images, a display time of the one or more other message images, and then determines the display time of the one message image on the basis of display times of the one or more other message images.

3. A message image display device according to claim 1, wherein
    the means for determining determines, in determining a display time of one message image of the plurality of message images, when it is judged that display of at least a part of the one message image is limited by one or more other message images among the plurality of message images, the display time of the one message image on the basis of a size of the part of the one message image, display of which is limited by the one or more other message images.

4. A message image display device according to claim 2 or 3, wherein
    the means for determining determines, in determining a display time of one message image of the plurality of message images, when it is judged that display of at least a part of the one message image is limited by a plurality of other message images among the plurality of message images, the display time of the one message image on the basis of a longest display time among display times of the plurality of other message images.

5. A control method for a message image display device, comprising:
 causing a display to display a screen including plurality of message images;
 judging whether the display of at least a part of a message image is limited by one or more other message images among the plurality of message images; and
 determining a display time of each of the plurality of message images on the basis of a result of the judgment by the judging,
 wherein the causing includes causing the display to display each of the plurality of message images over the display time of the message image determined by the determining.

6. A non-transitory computer-readable information storage medium storing a program for causing a computer to function as a message image display device, and also to function as:
 means for causing a display to display a screen including plurality of message images;
 means for judging whether the display of at least a part of a message image is limited by one or more other message images among the plurality of message images; and
 means for determining a display time of each of the plurality of message images on the basis of a result of the judging,
 wherein the means for causing causes the display to display each of the plurality of message images over the display time of the message image determined by the means for determining.

* * * * *